US006988743B2

(12) United States Patent
Okamoto et al.

(10) Patent No.: US 6,988,743 B2
(45) Date of Patent: Jan. 24, 2006

(54) AIRBAG APPARATUS

(75) Inventors: Hideaki Okamoto, Shiga (JP); Masayoshi Kumagai, Shiga (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 10/116,083

(22) Filed: Apr. 5, 2002

(65) Prior Publication Data

US 2002/0145272 A1 Oct. 10, 2002

(30) Foreign Application Priority Data

Apr. 9, 2001 (JP) ............................ 2001-110200

(51) Int. Cl.
*B60R 21/16* (2006.01)

(52) U.S. Cl. .................................... 280/743.1; 280/732

(58) Field of Classification Search ............. 280/743.1, 280/728.1, 730.1; 493/405, 451, 458; 53/429, 53/116, 117

See application file for complete search history.

(56) References Cited

U.S. PATENT DOCUMENTS 5,140,799 A 8/1992 Satoh
5,178,407 A * 1/1993 Kelley .................... 280/728.1
5,492,367 A * 2/1996 Albright et al. ......... 280/743.1
5,531,477 A * 7/1996 Madrigal et al. ........ 280/743.1
5,538,281 A 7/1996 Patercsak
5,873,598 A * 2/1999 Yoshioka et al. ........... 280/732
5,957,486 A * 9/1999 Taguchi et al. .......... 280/743.1
6,196,585 B1 * 3/2001 Igawa .................... 280/743.1

FOREIGN PATENT DOCUMENTS

DE 199 36 425 A1 12/2000
JP 10297401 A * 11/1998
WO WO 02/43993 A1 6/2002

* cited by examiner

*Primary Examiner*—Ruth Ilan
(74) *Attorney, Agent, or Firm*—Foley & Lardner LLP

(57) ABSTRACT

An airbag apparatus in which a front portion of an airbag is inflated earlier than a rear portion of the airbag. A passenger-side airbag apparatus includes an airbag, a container accommodating the airbag, an inflator for generating gas for inflating the airbag, and a lid for covering an opening in the top of the container. A rear portion of the airbag is first folded, left and right portions of the airbag are then folded, and after that, a front portion (vehicle-front-side portion) of the airbag is folded.

5 Claims, 7 Drawing Sheets

AIRBAG APPARATUS

BACKGROUND

The present invention relates to an airbag apparatus which is suitably used as a passenger- or driver-side airbag apparatus installed in front of an occupant in a vehicle such as an automobile.

A passenger-side airbag apparatus comprises a container arranged in an instrument panel in front of a front passenger seat, a gas generator for inflating an airbag, the airbag which is folded and accommodated in the container, and a lid covering the container. As a vehicle comes in collision, the gas generator is actuated to supply gas into the airbag, whereby the airbag starts to inflate. As the airbag starts to inflate, the lid is pushed by the airbag to open so that the airbag inflates toward the vehicle cabin. The airbag is provided with a gas inlet for receiving gas from the gas generator. The peripheral edge of the gas inlet is connected to the container.

As described in Japanese Patent Unexamined Publication H04-100754 (incorporated by reference herein), the airbag is folded by a step of first reverse folding both left and right sides of the airbag toward the center, the airbag in this state being called as an interim folded body having a reduced lateral width, and a step of folding the interim folded body into a bellow, the airbag in this state being called as a lump body. Then, the lump body is accommodated in the container.

Hereinafter, the way of folding an airbag disclosed in the publication H04-100754 will be described with reference to FIGS. 11 through 17.

FIG. 11 is a perspective view showing an airbag 1 spread in a plane and a sub container 2. The airbag 1 is an envelop-like object of which the shorter sides 1*b* are rectilinear and the right and left longer sides 1*a* are curved in arc-like shape. Formed in the center of a layer on a side opposite to the surface to be arranged to confront an occupant is gas inlet 3 for receiving gas from an inflator. Also formed in the layer are gas outlets (vent holes) 4 for buffering impact on the occupant when the occupant collides with the deployed (fully inflated) airbag. Numeral 5 designates rivet holes. The sub container 2 has a bottom face with holes 6 for passage of gas from the inflator.

As shown in FIG. 12, the airbag 1 is spread in a plane in a state that the sub container 2 is connected to the airbag 1. Then, as shown in FIG. 13 and FIG. 14 (sectional view taken along a line XIV—XIV of FIG. 13), portions along the longer sides 1*a* are folded inside the airbag 1 to make the width of the airbag 1 slightly smaller than the width of the sub container 2, so as to form an interim folded body.

Next, as shown in FIG. 15 (side view taken from a line XV—XV of FIG. 13), the interim folded body is repeatedly folded into a bellow to make valley and mountain folds 7 in directions perpendicular to the rectilinear longer sides 1*a*' of the interim folded body. As shown in FIG. 16, repeatedly folded portions are piled on each other to form a lump body and the lump body is accommodated in the sub container 2 (FIG. 17).

In this publication H04-100754, the folded airbag is accommodated in the sub container 2 and the sub container 2 with the airbag is accommodated in a main container (not shown). However, the sub container may be omitted and in this case, the folded airbag is directly accommodated in a container.

In the conventional passenger-side airbag device, the airbag 1 is folded so as to form the lump body. The peripheral edge of the gas inlet 3 of the airbag 1 is connected to the sub container 2. Assuming the area of the airbag 1 about the periphery of the gas inlet 3 is composed of two area: a windshield-side area 1A connected to a windshield side 2A of the sub container 2 and an occupant-side area 1B connected to the occupant-side 2B of the sub container 2, the windshield-side area 1A and the occupant-side area 1B are equal in length.

Therefore, when the airbag 1 is inflated (deployed) by gas from the inflator, the airbag 1 is deployed such that a vehicle-front side portion i.e. the windshield side portion and a vehicle-rear side portion i.e. the occupant side portion of the airbag are substantially symmetrically inflated.

It was found from various studies that the smooth deployment of the airbag may be obtained by such a structure that the front portion (vehicle-front side portion) of the airbag is inflated earlier than the rear portion (vehicle-rear side portion) of the airbag, but of course, it depends on the layout of the cabin and the arrangement angle of the instrument panel of the vehicle and the arrangement of the airbag apparatus.

It is an object of the present invention to provide an airbag apparatus in which a front portion (vehicle-front side portion) of an airbag is inflated earlier than a rear portion (vehicle-rear side portion) of the airbag.

SUMMARY OF THE INVENTION

According to an embodiment of the present invention an airbag apparatus comprising a folded airbag and a gas generator for inflating the airbag is provided. The airbag is configured to be deployed in front of an occupant, and the airbag may be folded so that a front portion thereof in the longitudinal direction of a vehicle is inflated earlier than a rear portion thereof.

According to an embodiment of the present invention, the rear portion of the airbag is first folded, then left and right portions are then folded, and after that, the front portion is folded, thereby ensuring that the front portion is inflated earlier than the rear portion in a process of deployment of the airbag.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

FIG. 1(*b*) is a sectional view taken along line Ib—Ib of FIG. 1(*a*).

FIG. 2(*b*) is a sectional view taken along line IIb—IIb of FIG. 2(*a*).

FIG. 3(*b*) is a sectional view taken along line IIIb—IIIb of FIG. 3(*a*).

FIG. 4(*b*) is a sectional view taken along line IVb—IVb of FIG. 4(*a*).

DETAILED DESCRIPTION

Figure 1A:
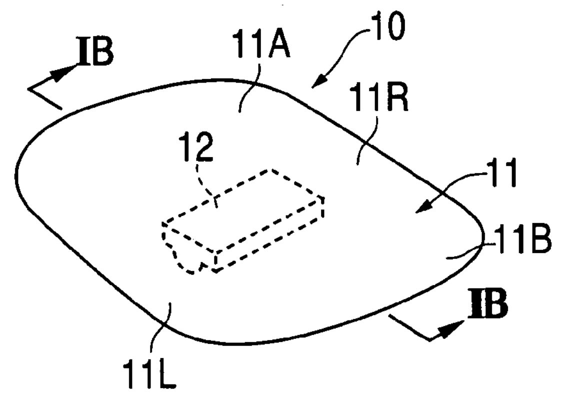
FIG. 1(*a*) is a perspective view of a spread out airbag according to an embodiment of the present invention.
Figure 1B:
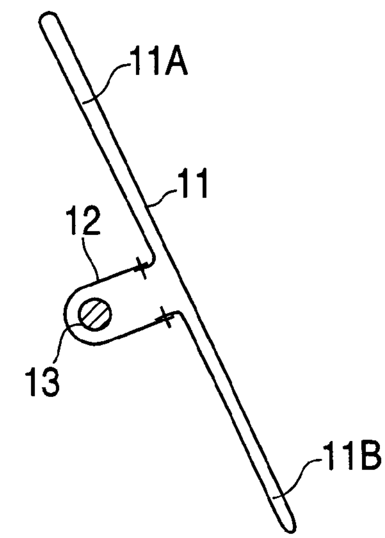
Figure 2A:
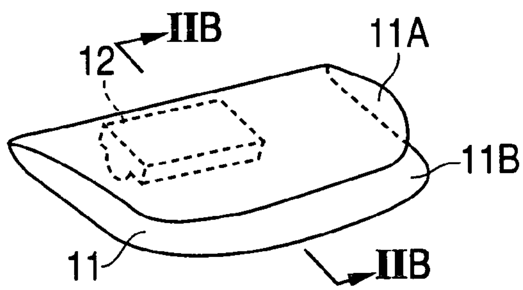
FIG. 2(*a*) is a perspective view of the airbag of FIG. 1(*a*) with a rear portion of the airbag folded over a front portion of the airbag.
Figure 2B:
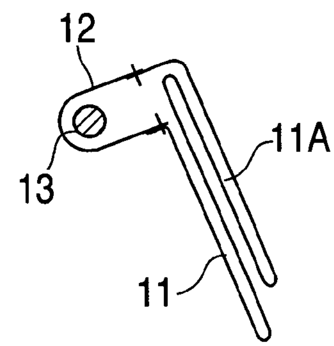
Figure 9:
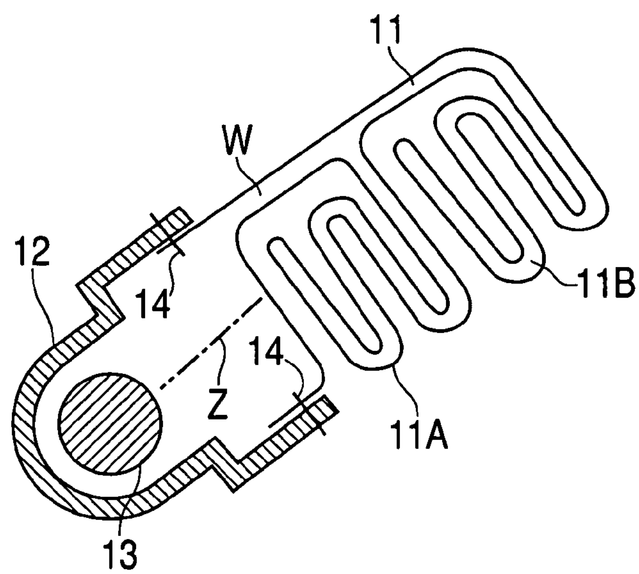
FIG. 9 is a sectional view of the folded airbag of FIG. 8.
Figure 10A:
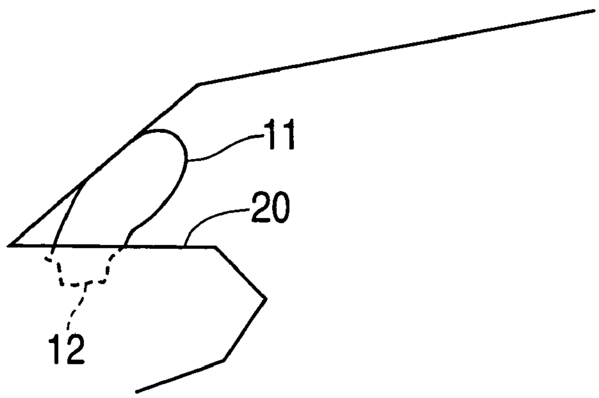
FIGS. 10(*a*)–10(*c*) depict the inflation sequence for the airbag apparatus according to the embodiment shown in FIGS. 1–8.
Figure 10B:
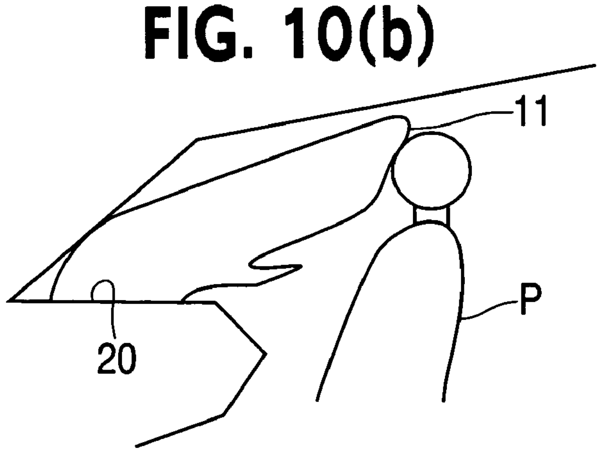
Figure 10C:
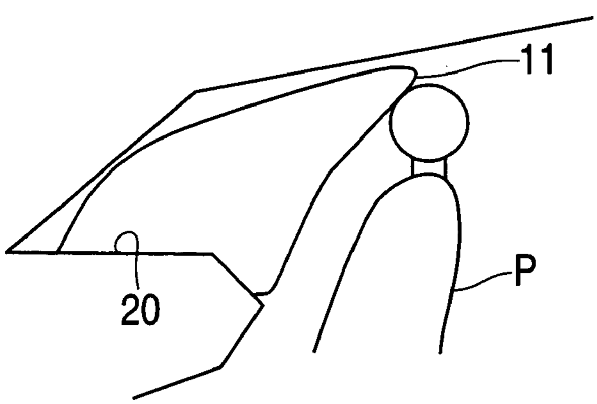
Figure 11:
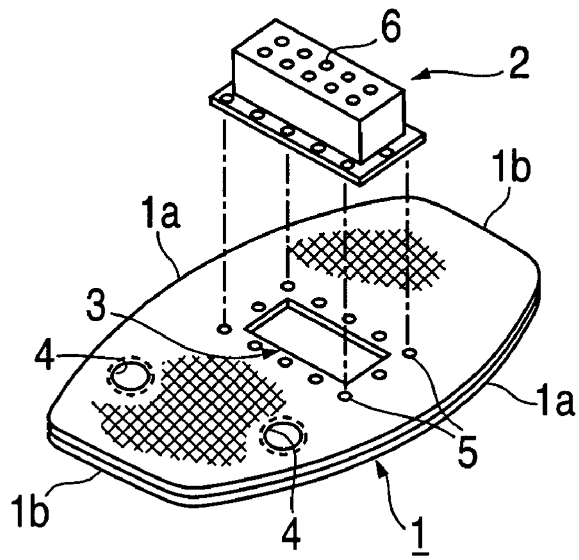
FIG. 11 is a perspective view of a conventional example.
Figure 12:
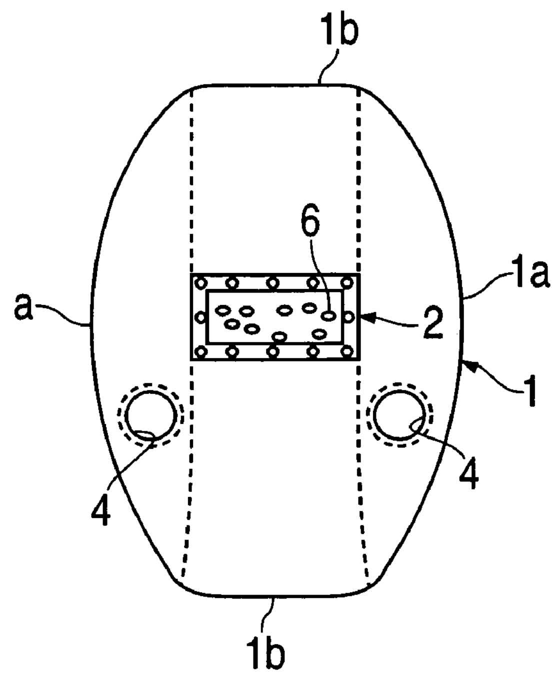
FIG. 12 is a plane view of the conventional example.
Figure 13:
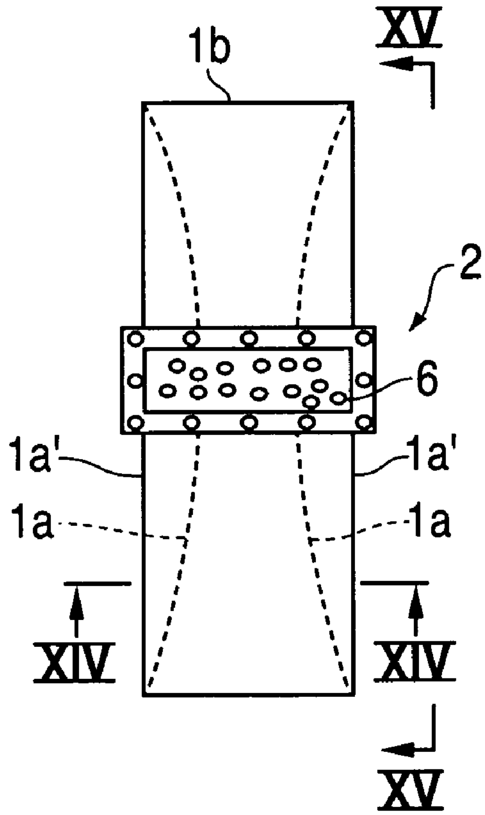
FIG. 13 is an illustration for explaining the process of folding an airbag of the conventional example.
Figure 14:
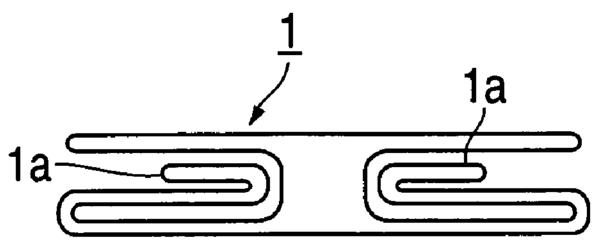
FIG. 14 is a sectional view taken along a line XIV—XIV of FIG. 13.
Figure 15:
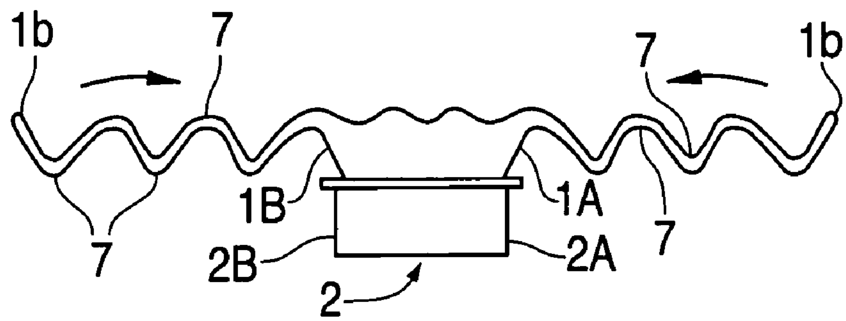
FIG. 15 is an illustration for explaining the process of folding the airbag of the conventional example.
Figure 16:
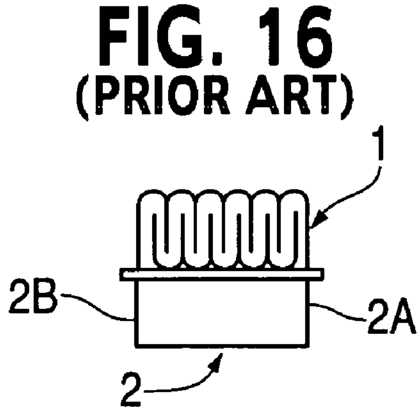
FIG. 16 is an illustration for explaining the process of folding the airbag of the conventional example.
Figure 17:
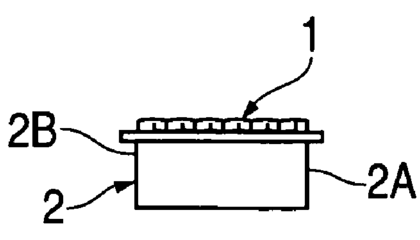
FIG. 17 is an illustration for explaining the process of folding the airbag of the conventional example.

Hereinafter, an embodiment of the present invention will be described with reference to the attached drawings. FIG. 1(*a*) through FIG. 9 are illustrations for explaining a process of folding an airbag of a passenger-side airbag apparatus according to the embodiment. FIGS. 1(*a*), 2(*a*), 3(*a*), 4(*a*) and FIGS. 5–8 are perspective views, FIGS. 1(*b*), 2(*b*), 3(*b*), 4(*b*) are sectional views taken along line Ib—Ib, IIb—IIb, IIIb—IIIb, IVb—IVb of FIGS. 1(*a*), 2(*a*), 3(*a*), 4(*a*), respectively, and FIG. 9 is a sectional view showing a state that the folded airbag is about to be assembled into a container. FIGS. 10(*a*)–10(*c*) are drawings for explaining profiles of the inflating airbag.

The passenger-side airbag apparatus 10 comprises an airbag 11, a container 12 accommodating the airbag 11, an inflator 13 which is attached to the container 12 for generating gas for inflating the airbag 11, and a lid (not shown) for covering an opening in the top of the container 12. As shown in FIG. 9, the airbag 11 is secured around its gas inlet to the container 12 by a fastening member 14.

Figure 3A:
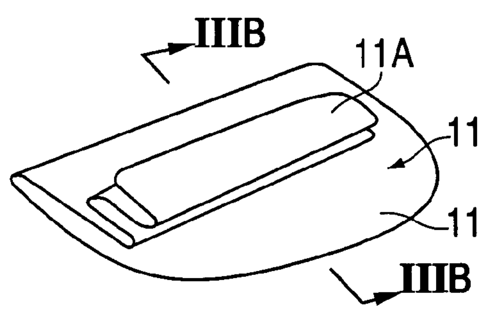
FIG. 3(*a*) is a perspective view of the airbag of FIG. 2(*a*) with the rear portion of the airbag folded along fold lines extending in left and right directions.
Figure 3B:
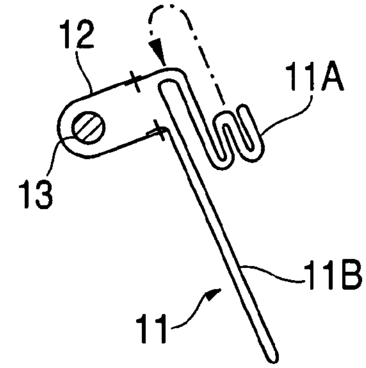

For folding and accommodating the airbag 11 into the container 12, the airbag 11 is first spread in plain as shown in FIGS. 1(*a*), 1(*b*) and is folded in such a manner that a rear portion 11A, to be arranged at the vehicle-rear side (at the instrument panel 20 side in FIG. 10), is superposed on the top of the container 12. After that, as shown in FIGS. 3(*a*), 3(*b*), the rear portion 11A is folded zigzag (i.e. in an accordion type fold) into a block shape which is long and narrow in the left-to-right direction. The folds formed by this folding extend in the left-to-right direction of the airbag 11.

Figure 4A:
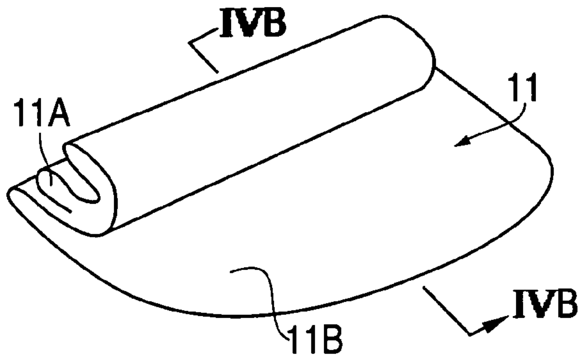
FIG. 4(*a*) is a perspective view of the airbag of FIG. 3(*a*) with the rear portion of the airbag folded in the opposite direction of FIG. 2(*a*).
Figure 4B:
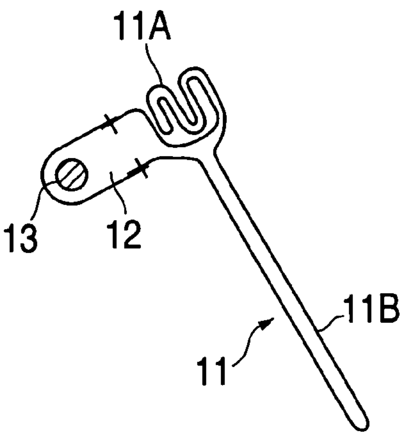

The rear portion 11A in the block shape is reversed according to an arrow in FIG. 3(*b*) and is sunk inside the airbag 11 as shown in FIGS. 4(*a*), 4(*b*).

Figure 5:
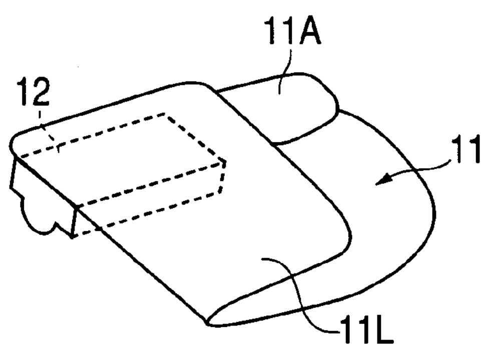
FIG. 5 is a perspective view of the airbag of FIG. 4(*a*) with the left portion of the airbag fold over.
Figure 6:
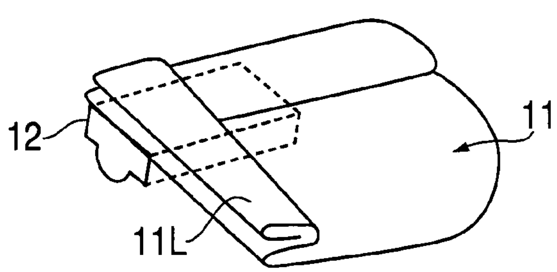
FIG. 6 is a perspective view of the airbag of FIG. 5 with the left portion of the airbag folded into a narrow width.

After that, as shown in FIG. 5, a left portion 11L of the airbag 11 is folded toward the right side in such a manner that the left portion 11L is superposed on the top of the container 12 and, as shown in FIG. 6, is further folded several times into a narrow width. The folds formed by this folding of the left portion 11L extend in the front-to-back direction.

Figure 7:
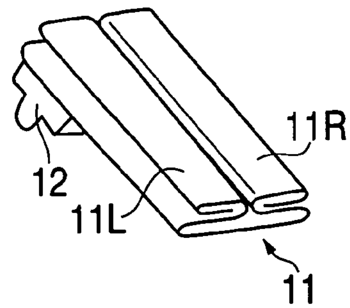
FIG. 7 is a perspective view of the airbag of FIG. 6 with the right portion of the airbag folded in a similar manner to the left portion.

Then, in a symmetrical manner as the left portion 11L, a right portion 11R of the airbag 11 is folded such that the right portion 11R is superposed on the top of the container 12 and is further folded several times into a narrow width as shown in FIG. 7. The folds formed by this folding of the right portion 11R extend in the front-to-back direction.

Figure 8:
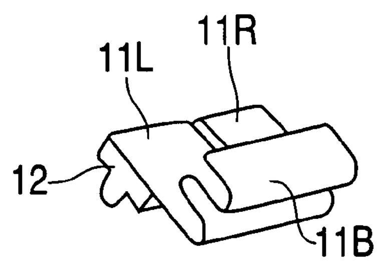
FIG. 8 is a perspective view of the airbag of FIG. 7 with the front portion of the airbag folded over and folded along fold lines extending in the left and right directions.

After that, as shown in FIG. 8, a front portion 11B of the airbag 11 is folded such that the front portion is superposed on the top of the container 12 and is further folded zigzag (i.e. in an accordion type fold) into a block shape. The folds formed by this folding of the front portion 11B extend in the left-to-right direction. The front portion 11B in the block shape is turned by 180° over the top of the container 12, whereby the folded portions of the airbag are entirely piled on the top of the container 12 (FIG. 9). Then, this piled portion is slid (parallel movement) into the container 12 (see the arrow Z in FIG. 9). The lid is put on the container 12, thereby assembling the airbag apparatus. As shown in FIG. 9, the front portion 11B folded zigzag is disposed above (on the outlet side of the container 12) the rear portion 11A which is also folded zigzag. Further, as shown in FIG. 9, a gas passage W for introducing gas from the inflator 13 into the front portion 11B and the rear portion 11A exists at the vehicle front side (windshield side) in the piled body of the airbag. The direction of the gas passage W is completely opposite to the direction of arrow Z to extend along the front side (windshield side) of the piled body in a state that the folded bodies 11A, 11B are pushed out from the container 12 but still piled on each other.

As shown in FIG. 10(*a*), the airbag apparatus is installed in an upper portion of the instrument panel 20 which extends substantially horizontally or slightly downward toward the rear side of the vehicle. As the inflator 13 is actuated to spout out gas in the event of a vehicle collision, the lid is torn to open and the airbag 11 starts to inflate as shown in FIGS. 10(*a*), 10(*b*), 10(*c*) in this order. In this case, the front portion 11B and the rear portion 11A are pushed out from the container 12 in the still piled state as shown in FIG. 9 by gas pressure from the inflator 13. The gas flows through the gas passage W in the direction opposite to the direction of arrow Z of FIG. 9 so as to flow preferentially into the front portion 11B to inflate the front portion 11B, whereby the airbag 11 first receives the head of an occupant P as shown in FIG. 10(*b*). Then, as shown in FIG. 10(*c*), the rear portion 11A of the airbag 11 is also inflated so as to receive the upper body of the occupant P. In this manner, the airbag apparatus has a behavioral characteristic of first receiving the head of the occupant P.

The aforementioned embodiment should be taken as an example of the present invention. The present invention can be adopted to another form not illustrated. For example, though the left portion 11L is folded before the right portion 11R is folded as shown in FIGS. 5–7 in the aforementioned embodiment, the right portion 11R may be folded before the left portion 11L is folded, or the left portion 11L and the right portion 11R may be folded simultaneously if possible. The left portion 11L and the right portion 11R may be folded zigzag (i.e. in an accordion type fold).

As described above, the present invention provides an airbag apparatus having such a behavioral characteristic that a front portion of an airbag is inflated earlier than a rear portion of the airbag.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An airbag apparatus for a vehicle having a longitudinal direction comprising:

a folded airbag;

a gas generator for inflating the airbag;

wherein the airbag is configured to deploy in front of an occupant of the vehicle;

wherein the airbag is folded such that a front portion of the airbag in the longitudinal direction of the vehicle is inflated earlier than a rear portion of the airbag;

wherein a gas passage for introducing gas from the gas generator into the airbag is located at a vehicle front side portion of the folded airbag;

wherein the rear portion of the airbag is first folded at least twice in different directions, then left and right portions are then folded, and after that, the front portion is folded; and wherein the gas passage is located adjacent to a vehicle front side portion of a container when the airbag is positioned inside the container.

2. A method of folding an airbag positioned to deploy in front of an occupant of a vehicle, the vehicle having a longitudinal direction extending from the front to the rear of the vehicle and a left to right direction generally perpendicular to the longitudinal direction, the method comprising the steps of:

folding a rear portion of the airbag;

folding left and right portions of the airbag;

folding a front portion of the airbag;

wherein the folding steps result in the front portion of the airbag inflating earlier than the rear portion of the airbag;

wherein the folding steps are accomplished in the order recited; and wherein during the step of folding the rear portion of the airbag, the rear portion of the airbag is folded over the front portion of the airbag and then accordion folded into a block shape extending in the left to right direction.

3. An airbag module for a vehicle comprising:

a folded airbag positioned in a container; and a gas generator for inflating the airbag;

wherein the airbag is configured to deploy in front of an occupant of the vehicle;

wherein the airbag includes a front portion that deploys into a position adjacent a windshield and a rear portion;

wherein the airbag is folded so that the front portion inflates before the rear portion;

wherein the airbag includes a gas passage for introducing gas from the gas generator into the front and rear portions; the passage located at a vehicle front side portion of the folded airbag;

wherein the rear portion of the airbag is first folded multiple times in opposite directions, then left and right portions are then folded, and after that, the front portion is folded, and wherein the rear portion of the folded airbag is located inside the container adjacent to the gas generator.

4. The method of claim 2, wherein the step of folding the left and right portions of the airbag includes folding each of the left and right portions of the airbag along a fold line extending in the longitudinal direction, wherein the left and right portions of the airbag are first folded to an opposite side and then folded into a narrow width in a front-to-back direction at least two times, and wherein the left and right portions of the airbag are folded simultaneously.

5. An airbag module for a vehicle comprising:

a folded airbag positioned in a container; and a gas generator for inflating the airbag;

wherein the airbag is configured to deploy in front of an occupant of the vehicle;

wherein the airbag includes a front portion that deploys into a position adjacent a windshield and a rear portion;

wherein the airbag is folded so that the front portion inflates before the rear portion;

wherein the airbag includes a gas passage for introducing gas from the gas generator into the front and rear portions; the passage located at a vehicle front side portion of the folded airbag;

wherein the folded airbag is configured so that the rear portion of the airbag is first folded, then left and right portions are then folded, and after that, the front portion is folded so that the front and rear portions are positioned in separate folded sections in the container, and the rear portion of the folded airbag is located adjacent to the gas generator.

* * * * *